US 9,343,982 B2

(12) United States Patent
Yang

(10) Patent No.: US 9,343,982 B2
(45) Date of Patent: May 17, 2016

(54) PRIMARY-SIDE CONTROLLED PROGRAMMABLE POWER CONVERTER

(71) Applicant: SYSTEM GENERAL CORPORATION, New Taipei (TW)

(72) Inventor: Ta-Yung Yang, Milpitas, CA (US)

(73) Assignee: SYSTEM GENERAL CORPORATION, New Taipei (TW)

( * ) Notice: Subject to any disclaimer, the term of this patent is extended or adjusted under 35 U.S.C. 154(b) by 265 days.

(21) Appl. No.: 14/046,085

(22) Filed: Oct. 4, 2013

(65) Prior Publication Data

US 2014/0192566 A1    Jul. 10, 2014

Related U.S. Application Data

(60) Provisional application No. 61/749,981, filed on Jan. 8, 2013.

(51) Int. Cl.
*H02M 3/335* (2006.01)

(52) U.S. Cl.
CPC ................................. *H02M 3/33523* (2013.01)

(58) Field of Classification Search
CPC ............... H02M 3/335077; H02M 3/33523; H02M 3/333592
USPC ............................................ 363/21.12–21.18
See application file for complete search history.

(56) References Cited

U.S. PATENT DOCUMENTS

| 5,205,294 | A  | * | 4/1993  | Flach et al. ..................... 600/508 |
| 6,487,282 | B1 | * | 11/2002 | Xia et al. ..................... 379/106.03 |
| 6,977,824 | B1 |   | 12/2005 | Yang et al. |
| 7,016,204 | B2 |   | 3/2006  | Yang et al. |
| 7,352,595 | B2 |   | 4/2008  | Yang et al. |
| 8,492,987 | B2 | * | 7/2013  | Nuhfer et al. .................. 315/246 |
| 8,953,341 | B2 | * | 2/2015  | Fahlenkamp ............... 363/21.01 |

* cited by examiner

*Primary Examiner* — Yemane Mehari
(74) *Attorney, Agent, or Firm* — McClure, Qualey & Rodack, LLP

(57) ABSTRACT

A circuit for controlling a programmable power converter is provided. The circuit comprises a control circuit, a switching controller, and a first opto-coupler. The control circuit generates a programmable voltage-reference signal for regulating an output voltage of the programmable power converter. A feedback circuit of the control circuit detects the output voltage for generating a feedback signal in response to the programmable voltage-reference signal and the output voltage. The switching controller detects a switching current of a transformer for generating a switching signal coupled to switch the transformer for generating the output voltage and an output current in response to the feedback signal and the switching current of the transformer. The first opto-coupler transfers the feedback signal from the control circuit to the switching controller. The control circuit is at the secondary side of the transformer and the switching controller is at the primary side of the transformer.

15 Claims, 8 Drawing Sheets

PRIMARY-SIDE CONTROLLED PROGRAMMABLE POWER CONVERTER

CROSS REFERENCE TO RELATED APPLICATIONS

This application claims the benefit of U.S. Provisional Application No. 61/749,981, filed on Jan. 8, 2013, the contents of which are incorporated herein by reference.

BACKGROUND OF THE INVENTION

1. Field of the Invention

The present invention relates to a programmable power converter; more specifically, the present invention relates to a primary-side controlled programmable power converter.

2. Description of the Related Art

Manufacturers of today's power converters for mobile devices, such as notebooks, cellular phones, and tablet computers, provide various designs to supply those mobile devices with different voltage and current characteristics. Therefore, users with multiple mobile devices are often required to carry all of those power converters for providing power to each individual mobile device, which becomes a burden for the users who often carry those devices with them. Accordingly, a need for a power converter to resolve this inconvenience is a programmable capability to supply a wide range of an output voltage and an output current, such as 5V~20V and 0.5 A~5 A. The electrical characteristics can be selected by the users to determine which portable device will be powered. However, programmable power converters are generally difficult to achieve good performances, e.g. high efficiency, fast loop response, and good loop stability, etc. The objective of the present invention is to solve the aforementioned problem and achieve fast loop response with good loop stability and high efficiency for programmable power converters.

BRIEF SUMMARY OF THE INVENTION

The objective of the present invention is to solve the aforementioned problem and achieve fast loop response with good loop stability and high efficiency for programmable power converters.

The present invention provides a circuit for controlling a programmable power converter. The circuit comprises a control circuit, a switching controller, a first opto-coupler, and a second opto-coupler. The control circuit generates a programmable voltage-reference signal for regulating an output voltage of the programmable power converter. The control circuit comprises a feedback circuit. The feedback circuit is coupled to detect the output voltage for generating a feedback signal in response to the programmable voltage-reference signal and the output voltage. The switching controller is coupled to detect a switching current of a transformer for generating a switching signal coupled to switch the transformer for generating the output voltage and an output current in response to the feedback signal and the switching current of the transformer. The first opto-coupler is coupled to transfer the feedback signal from the control circuit to the switching controller. The control circuit is at the secondary side of the transformer, and the switching controller is at the primary side of the transformer. The control circuit has a communication interface for communicating with external devices. The switching controller is coupled to detect a reflected signal of the transformer for regulating the output current of the power converter in response to a demagnetizing time of the transformer. The switching controller is coupled to detect a reflected signal for performing an over-voltage protection in the switching controller. The second opto-coupler transfers a control signal of the control circuit to the switching controller.

The control circuit further comprises a digital-to-analog converter, a micro-controller, and an analog-to-digital converter. The digital-to-analog converter generates a programmable over-voltage threshold for performing an over-voltage protection in the control circuit. The feedback circuit comprises an over-voltage protection circuit. The over-voltage protection circuit is coupled to generate the control signal by comparing the output voltage and the programmable over-voltage threshold. The programmable over-voltage threshold will be reset to a minimum value whenever the programmable power converter is powered on. The control signal is coupled to generate an over-voltage signal for disabling the switching signal.

The micro-controller programs the programmable voltage-reference signal and the control signal. The control signal is coupled to control the switching controller via the second opto-coupler. The feedback circuit further comprises a watch-dog timer. The watch-dog timer is coupled to receive a controlling signal from the micro-controller. The watch-dog timer will generate an expired signal if the controlling signal is not generated in time periodically. The programmable over-voltage threshold will be reset to an initial value in response to the expired signal. The analog-to-digital converter is coupled to detect the output voltage of the programmable power converter. An output of the analog-to-digital converter is coupled to the micro-controller. The micro-controller has a memory circuit including a program memory and a data memory. The control circuit generates the control signal coupled to program an over-voltage threshold in the switching controller for an over-voltage protection of the output voltage of the programmable power converter. The control circuit generates the control signal coupled to control a current limit threshold in the switching controller for regulating the output current of the programmable power converter. The current limit threshold and the over-voltage threshold signal will be reset to respective initial values whenever the programmable power converter is powered on. The current limit threshold and the over-voltage threshold signal will be reset to respective minimums values if the control signal is not generated in time. The control signal is modulated by pulse position modulation. The programmable voltage-reference signal will be reset to its initial value whenever the programmable power converter is powered on.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention provides a control circuit for controlling a primary-side controlled programmable power converter. A programmable power converter can provide a wide range of an output voltage $V_O$ and an output current $I_O$, such as 5V~20V and 0.5 A~5 A. In general, it would be difficult to develop a cost effective solution and achieve good protections, such as over-voltage protection and current-limit protection, for the primary-side controlled programmable power converters. The objective of the present invention is to solve this problem for achieving low cost and good performance for primary-side controlled programmable power converters.

Figure 1:
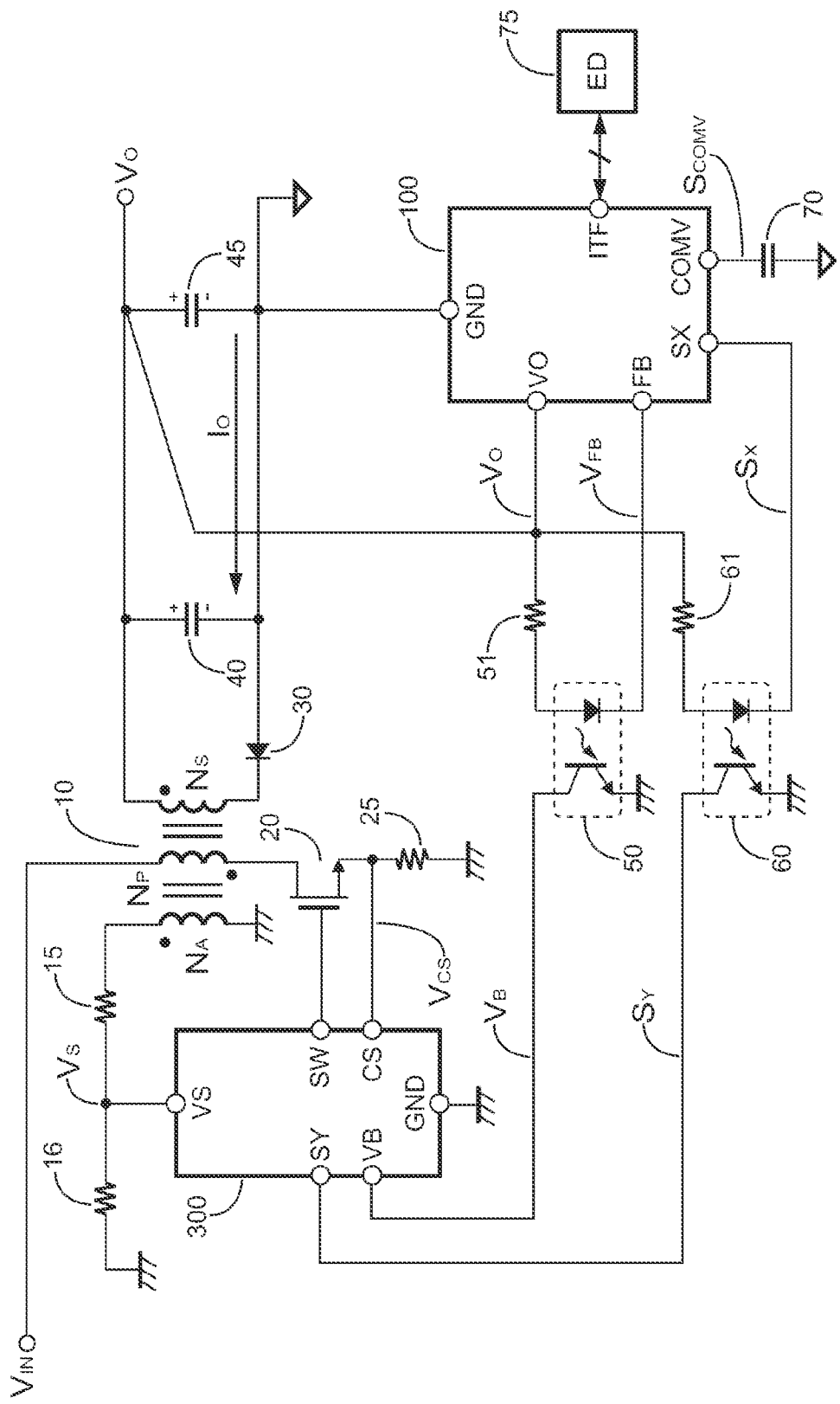
FIG. 1 shows an exemplary embodiment of a primary-side controlled programmable power converter according to the present invention.

FIG. 1 shows an exemplary embodiment of a primary-side controlled programmable power converter according to the present invention. The power converter comprises a transformer 10, a voltage divider, a switching controller 300, a power switch 20, a sense resistor 25, a rectifier 30, output capacitors 40 and 45, a control circuit 100, a capacitor 70, resistors 51 and 61, a first opto-coupler 50, and a second opto-coupler 60. The transformer 10 has a primary winding $N_P$, a secondary winding $N_S$, and an auxiliary winding $N_A$. The voltage divider is formed by resistors 15 and 16. The control circuit 100 is coupled to detect an output voltage $V_O$ of the power converter for developing a feedback loop. The control circuit 100 generates a feedback signal $V_{FB}$ coupled to the switching controller 300 via the first opto-coupler 50 for regulating the output voltage $V_O$. The capacitor 70 is applied to compensate a voltage feedback loop for regulating the output voltage $V_O$. The control circuit 100 further generates a control signal $S_X$ coupled to control the switching controller 300 via the second opto-coupler 60. The control signal $S_X$ is used for programming parameters of the switching controller 300 and for providing protection ability. The resistor 51 is utilized to bias the first opto-coupler 50 for generating an operating current. The resistor 61 is applied to limit an operating current of the second opto-coupler 60. The control circuit 100 includes a communication interface ITF, (e.g. USB-PD, IEEE UPAMD 1823, one-wire communication, etc.) for communicating with an external device (ED) 75 which can be mobile phone, tablet-PC, Notebook-PC, and etc.

The first opto-coupler 50 will generate a feedback signal $V_B$ in response to the feedback signal $V_{FB}$. The second opto-couplers 60 will generate a control signal $S_Y$ in response to the control signal $S_X$. The switching controller 300 generates a switching signal $S_W$ for switching the primary winding $N_P$ of the transformer 10 and generating the output voltage $V_O$ and the output current $I_O$ by the secondary winding $N_S$ of the transformer 10 through the rectifier 30 and the output capacitor 40. The transformer 10 further produces a reflected signal $V_S$ coupled to the switching controller 300 at a joint of the voltage divider. The sense resistor 25 is coupled to sense a switching current of the transformer 10 for generating a current signal $V_{CS}$ coupled to the switching controller 300. The switching controller 300 generates the switching signal $S_W$ in response to the feedback signal $V_B$, the control signal $S_Y$, the reflected signal $V_S$, and the current signal $V_{CS}$. The control circuit 100 is at the secondary side of the transformer 10. The switching controller 300 is at the primary side of the transformer 10.

Figure 2:
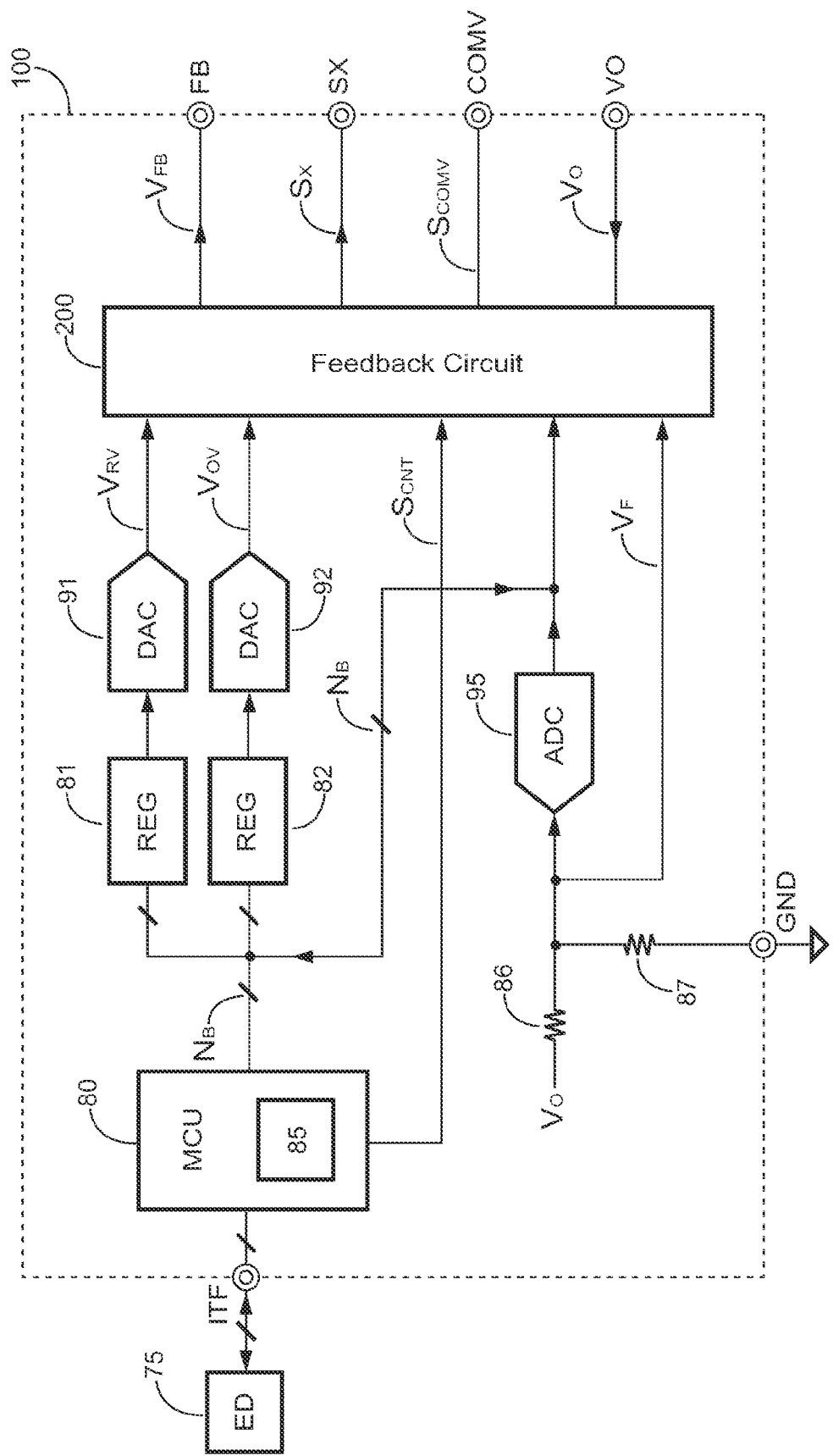
FIG. 2 shows an exemplary embodiment of a control circuit of the primary-side controlled programmable power converter according to the present invention.

FIG. 2 shows an exemplary embodiment of the control circuit 100 of the primary-side controlled programmable power converter according to the present invention. The control circuit 100 comprises a micro-controller (MCU) 80, a voltage divider formed by resistors 86 and 87, registers (REG) 81 and 82, digital-to-analog converters (DAC) 91 and 92, an analog-to-digital converter (ADC) 95, and a feedback circuit 200. The micro-controller 80 has a memory circuit 85 including a program memory and a data memory. The micro-controller 80 generates a controlling signal $S_{CNT}$ and a bus signal $N_B$. The bus signal $N_B$ is bi-directional (input/output). The micro-controller 80 is coupled to the communication interface ITF to communicate with the external device 75. The bus signal $N_B$ is coupled to control the analog-to-digital converter 95 and the digital-to-analog converters 91 and 92. The digital-to-analog converters 91 and 92 are controlled by the bus signal $N_B$ generated from the micro-controller 80 via the registers 81 and 82, respectively.

The voltage divider detects the output voltage $V_O$ and generates a feedback voltage $V_F$ in response to the output voltage $V_O$. The feedback voltage $V_F$ is coupled to the analog-to-digital converter 95. Therefore, via the bus signal $N_B$, the micro-controller 80 can read the information of the output voltage $V_O$. The micro-controller 80 controls the outputs of the digital-to-analog converters 91 and 92. The digital-to-analog converter 91 generates a voltage-reference signal $V_{RV}$ for controlling the output voltage $V_O$. The digital-to-analog converter 92 generates an over-voltage threshold $V_{OV}$ for an over-voltage protection of the power converter. The voltage-reference signal $V_{RV}$ and the over-voltage threshold $V_{OV}$ are programmable. The over-voltage threshold $V_{OV}$ will be reset to an initial value whenever the control converter is powered on. The micro-controller 80 will control the over-voltage threshold $V_{OV}$ in response to the level of the output voltage $V_O$. The registers 81 and 82 will be reset to an initial value whenever the control circuit 100 is powered on. For example, the initial value of the register 81 will produce a minimum value of the voltage-reference signal $V_{RV}$ to generate a 5V output voltage $V_O$.

The feedback circuit 200 generates a voltage-feedback signal $S_{COMV}$, the feedback signal $V_{FB}$, and the control signal $S_X$ in response to the voltage-reference signal $V_{RV}$, the over-voltage threshold $V_{OV}$, the output voltage $V_O$, the feedback voltage $V_F$, the controlling signal $S_{CNT}$, and the bus signal $N_B$.

Figure 3:
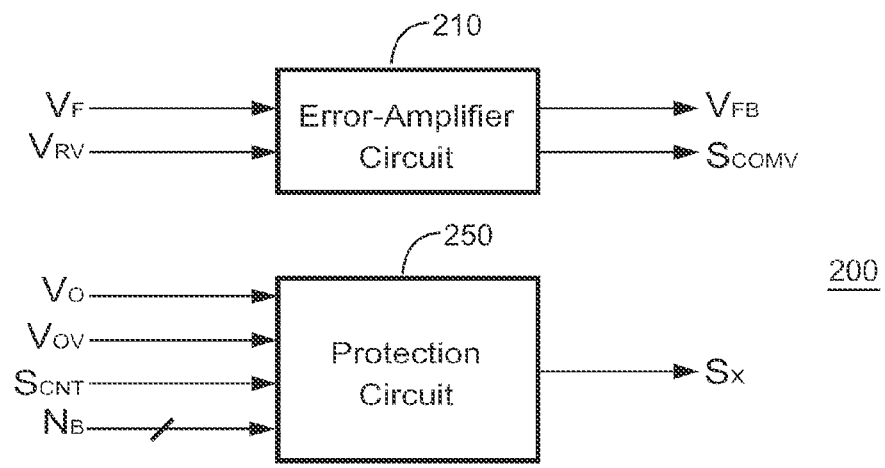
FIG. 3 shows a block schematic of an exemplary embodiment of a feedback circuit of the control circuit according to the present invention.

FIG. 3 shows a block schematic of an exemplary embodiment of the feedback circuit 200 of the control circuit according to the present invention. The feedback circuit 200 includes an error-amplifier circuit 210 and a protection circuit 250. The error-amplifier circuit 210 generates the voltage-feedback signal $S_{COMV}$ and the feedback signal $V_{FB}$ in accordance with the voltage-reference signal $V_{RV}$ and the feedback voltage $V_F$. The protection circuit 250 generates the control signal $S_X$ in response to the over-voltage threshold $V_{OV}$, the output voltage $V_O$, the controlling signal $S_{CNT}$, and the bus signal $N_B$. Accordingly, the micro-controller 80 can program the control signal $S_X$ through the controlling signal $S_{CNT}$.

Figure 4:
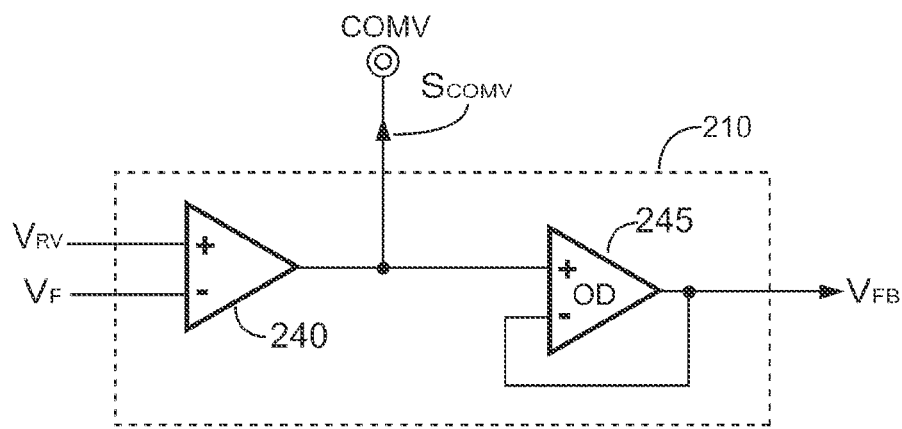
FIG. 4 shows an exemplary embodiment of an error-amplifier circuit of the feedback circuit according to the present invention.

FIG. 4 shows an exemplary embodiment of the error-amplifier circuit 210 of the feedback circuit 200 according to the present invention. The error amplifier circuit 210 generates the voltage-feedback signal $S_{COMV}$ in response to the feedback voltage $V_F$ and the voltage-reference signal $V_{RV}$. The voltage-feedback signal $S_{COMV}$ is coupled to the capacitor 70 for the loop-compensation. The voltage-feedback signal $S_{COMV}$ is further coupled to a buffer (OD) 245 to generate the feedback signal $V_{FB}$. The output of the buffer 245 is an open-drain type.

Figure 5:
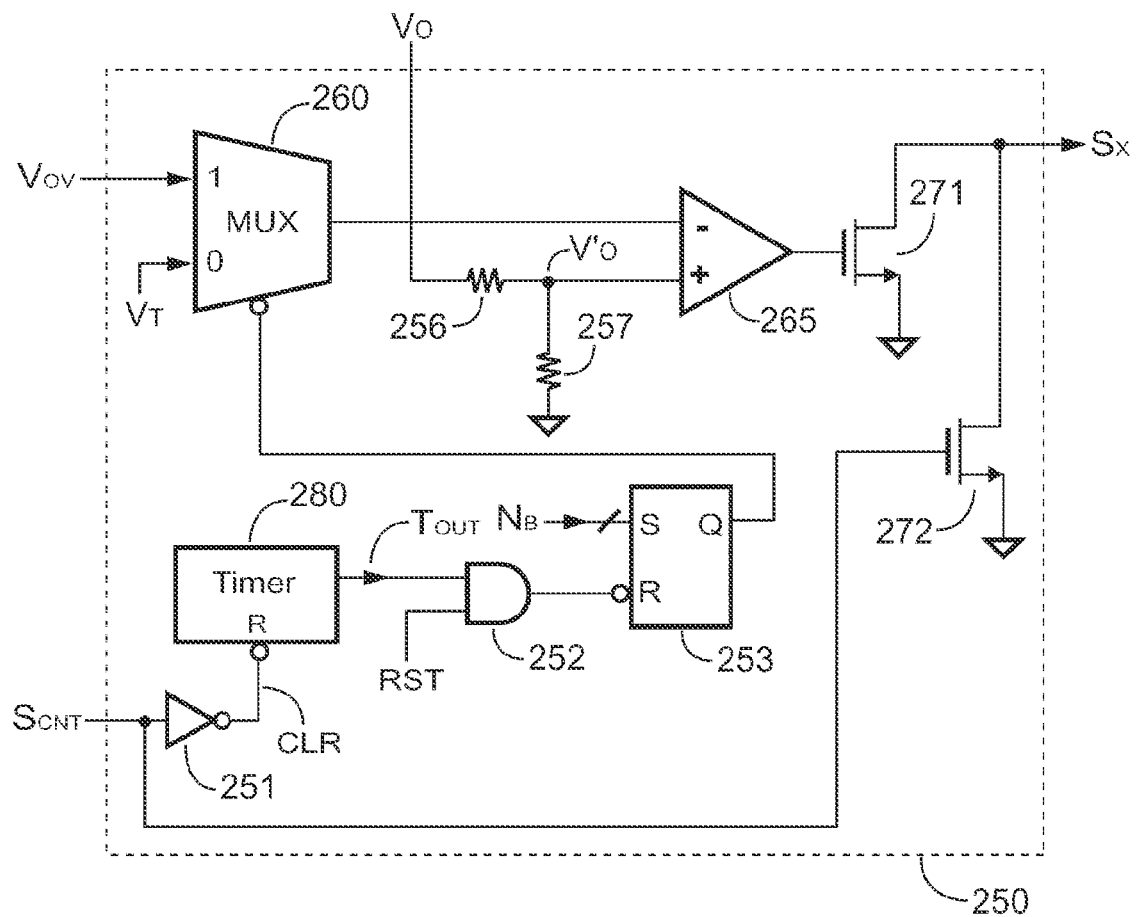
FIG. 5 shows an exemplary embodiment of a protection circuit of the feedback circuit according to the present invention.

FIG. 5 shows an exemplary embodiment of the protection circuit 250 of the feedback circuit 200 according to the present invention. The protection circuit 250 comprises a multiplexer (MUX) 260, a timer 280, an inverter 251, a comparator 265, transistors 271 and 272, an AND gate 252, a flip-flop 253, and a voltage divider formed by resistors 256 and 257. Via the inverter 251, the controlling signal $S_{CNT}$ is coupled to generate an input signal CLR to clear the timer 280 which is a watchdog timer. The timer 280 will generate an expired signal $T_{OUT}$ if the controlling signal $S_{CNT}$ is not generated periodically. The expired signal $T_{OUT}$ and a power-on-reset signal RST are coupled to reset the flip-flop 253 through the AND gate 252. The flip-flop 253 is set by the micro-controller 80 through the bus signal $N_B$. The over-voltage threshold $V_{OV}$ and a threshold $V_T$ are coupled to the comparator 265 via the multiplexer 260. The multiplexer 260 is controlled by the flip-flop 253. When the flip-flop 253 is set, the over-voltage threshold $V_{OV}$ will be coupled to a negative terminal of the comparator 265. If the flip-flop 253 is reset, the threshold $V_T$ will be coupled to the negative terminal of the comparator 265 for the over-voltage protection. The output voltage $V_O$ is attenuated by the voltage divider formed by the resistors 256 and 257 to be an attenuated output voltage $V'_O$. The attenuated output voltage $V'_O$ is coupled to a positive terminal of the comparator 265. The comparator 265, the transistor 271, and the voltage divider formed by the resistors 256 and 257 develop an over-voltage protection circuit. The threshold $V_T$ is a minimum threshold for performing over-voltage protection. The over-voltage threshold $V_{OV}$ of the over-voltage protection is programmable by the micro-controller 80. This over-voltage threshold $V_{OV}$ will be reset as its minimum value if the controlling signal $S_{CNT}$ is not generated in time periodically. In one embodiment of the present invention, the over-voltage threshold $V_{OV}$ will be programmed to 14V for a 12V output voltage $V_O$, and the over-voltage threshold $V_{OV}$ will be programmed to 6V for a 5V output voltage $V_O$. If the controlling signal $S_{CNT}$ is not generated by the micro-controller 80 timely, the over-voltage threshold $V_{OV}$ will be reset to 6V even the output voltage $V_O$ is set at 12V, which will protect the power converter from abnormal operation when the micro-controller 80 is operated incorrectly. An output of the comparator 265 drives the transistor 271 for generating the control signal $S_X$. The controlling signal $S_{CNT}$ also drives the transistor 272 to generate the control signal $S_X$. The drains of the transistors 271 and 272 are connected together to generate the control signal $S_X$. Thus, the control signal $S_X$ is used for protecting the programmable power converter and controlling the switching controller 300

Figure 6:
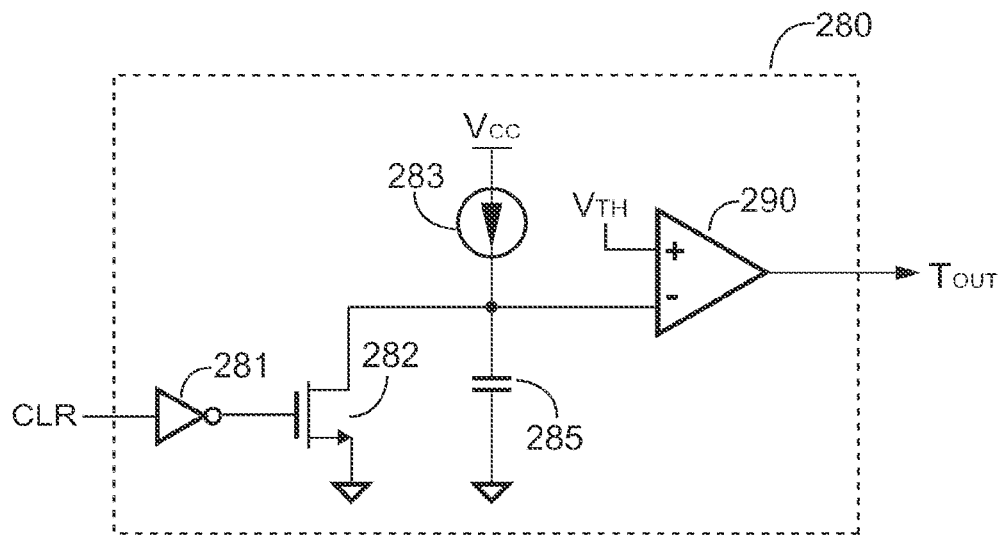
FIG. 6 shows an exemplary embodiment of a timer of the protection circuit according to the present invention.

FIG. 6 shows an exemplary embodiment of the timer 280 of the protection circuit 250 according to the present invention. The timer 280 functions as a watch-dog timer. The timer 280 comprises an inverter 281, a transistor 282, a current source 283, a capacitor 285, and a comparator 290. The constant current source 283 is utilized to charge the capacitor 285. The input signal CLR supplied to an reset input of the timer 280 discharges the capacitor 285 via the inverter 281 and the transistor 282. If the capacitor 285 is not completely discharged by the input signal CLR timely, the comparator 290 will generate the expired signal $T_{OUT}$ when the voltage across the capacitor 285 is higher than a threshold $V_{TH}$.

Figure 7:
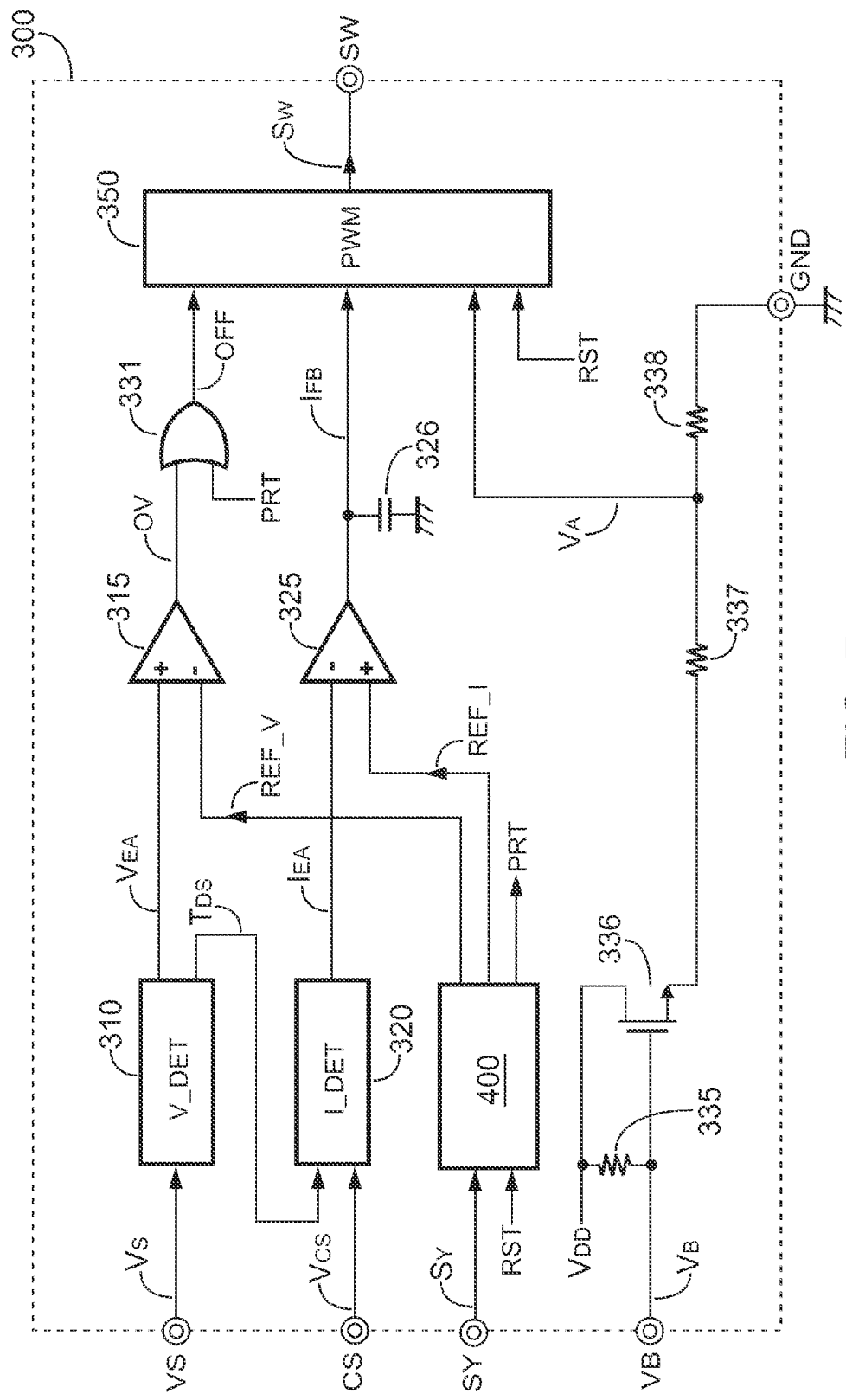
FIG. 7 shows an exemplary embodiment of a switching controller of the primary-side controlled programmable power converter according to the present invention.

FIG. 7 shows an exemplary embodiment of the switching controller 300 of the primary-side controlled programmable power converter according to the present invention. The switching controller 300 comprises a voltage detection circuit (V_DET) 310, a current detection circuit (I_DET) 320, a comparator 315, an error amplifier 325, an OR gate 331, a capacitor 326, a PWM circuit (PWM) 350, a programmable circuit 400, a transistor 336, and resistors 335, 337, and 338. The voltage detection circuit 310 generates a voltage-loop signal $V_{EA}$ and a discharge-time signal $T_{DS}$ in response to the reflected signal $V_S$. The voltage-loop signal $V_{EA}$ is correlated to the output voltage $V_O$. The discharge-time signal $T_{DS}$ is correlated to the demagnetizing time of the transformer 10. The current detection circuit 320 generates a current-loop signal $I_{EA}$ in response to the current signal $V_{CS}$ and the discharge-time signal $T_{DS}$. The voltage detection circuit 310 and the current detection circuit 320 are related to the technology of the primary side regulation (PSR) of the power converter. The detail of the skill of the primary side regulation can be found in the prior arts of U.S. Pat. No. 6,977,824 titled "Control circuit for controlling output current at the primary side of a power converter", U.S. Pat. No. 7,016,204 titled "Close-loop PWM controller for primary-side controlled power converters", and U.S. Pat. No. 7,352,595 titled "Primary-side controlled switching regulator", etc.

The voltage-loop signal $V_{EA}$ is coupled to the comparator 315 for generating an over-voltage signal OV when the magnitude of the voltage-loop signal $V_{EA}$ is higher than that of a reference signal REF_V. The reference signal REF_V is also an over-voltage threshold. The current-loop signal $I_{EA}$ is coupled to the error amplifier 325. The current-loop signal $I_{EA}$ associated with a reference signal REF_I generates a current feedback signal $I_{FB}$ through the error amplifier 325. The reference signal REF_I is also a current limit threshold. The capacitor 326 is coupled to the current feedback signal $I_{FB}$ for the loop compensation. The programmable circuit 400 is coupled to generate the reference signals REF_V and REF_I and a protection signal PRT in response to the control signal $S_X$ and the power-on reset signal RST. The reference signals REF_V and REF_I will be reset to their respective initial values whenever the programmable power converter is powered on. The reference signal REF_V is operated as an over-voltage threshold for the over-voltage protection. This over-voltage protection is functioned via the detection of the reflected signal $V_S$. The reference signal REF_I is operated as a current reference signal for regulating the output current $I_O$ of the power converter.

The protection signal PRT and the over-voltage signal OV are supplied to the OR gate 331 to generate an off signal OFF. The resistor 335 is utilized to pull high the feedback signal $V_B$. The feedback signal $V_B$ is coupled to generate a secondary feedback signal $V_A$ through the transistor 336 and the resistors 337 and 338. The PWM circuit 350 generates the switching signal $S_W$ in response to the secondary feedback signal $V_A$, the current feedback signal $I_{FB}$, the off signal OFF, and the power-on reset signal RST.

Figure 8:
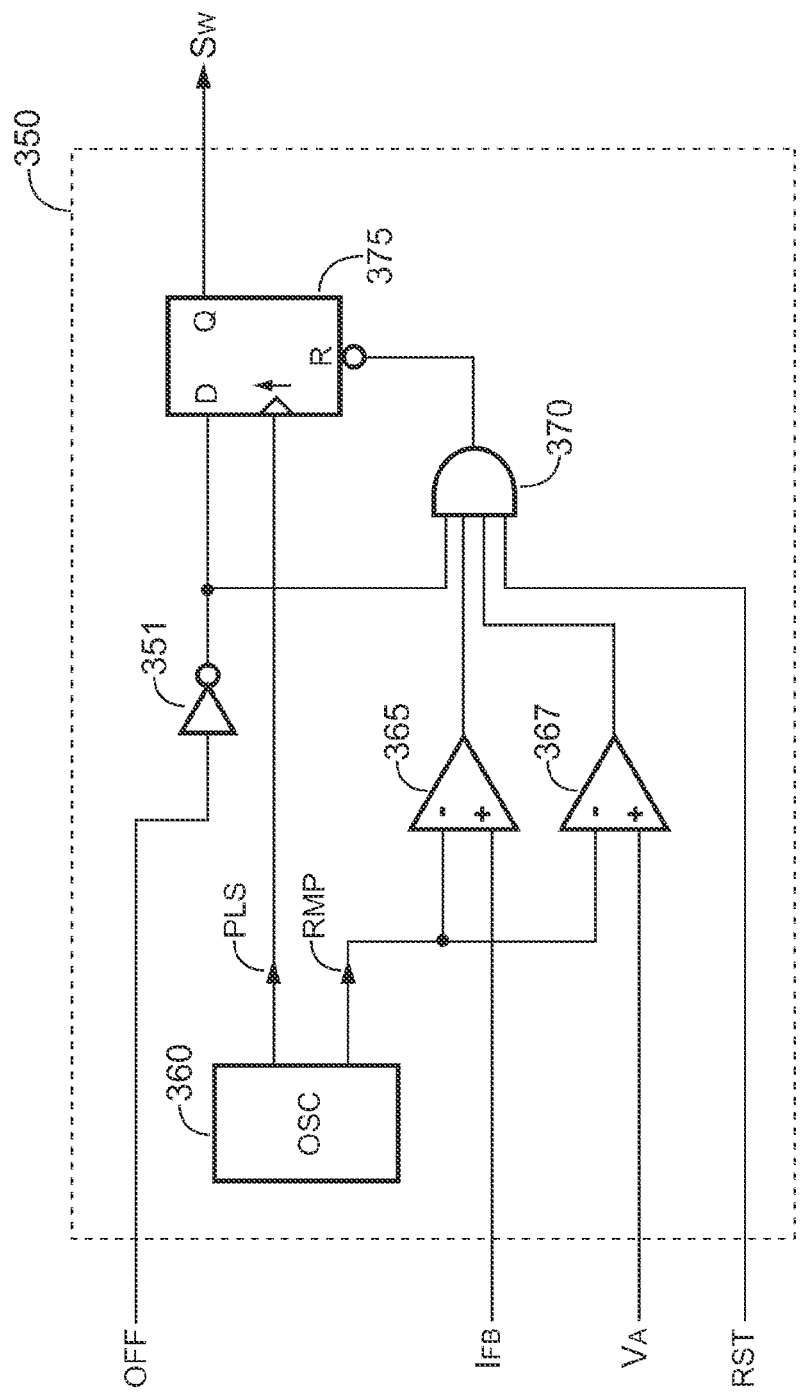
FIG. 8 shows a circuit schematic of an exemplary embodiment of a PWM circuit of the switching controller according to the present invention.

FIG. 8 shows a circuit schematic of an exemplary embodiment of the PWM circuit 350 of the switching controller 300 according to the present invention. The PWM circuit 350 comprises an oscillator 360 (OSC), comparators 365 and 367, an inverter 351, an AND gate 370, and a flip-flop 375. The oscillator 360 generates a clock signal PLS and a ramp signal RMP. The clock signal PLS periodically enables the switching signal $S_W$ via the flip-flop 375. The switching signal $S_W$ will be disabled once the ramp signal RMP is higher than the current feedback signal $I_{FB}$. Or, the switching signal $S_W$ will be also disabled once the ramp signal RMP is higher than the secondary feedback signal $V_A$. The off signal OFF is also coupled to disable the switching signal $S_W$ through the inverter 351 and the AND gate 370.

Figure 9:
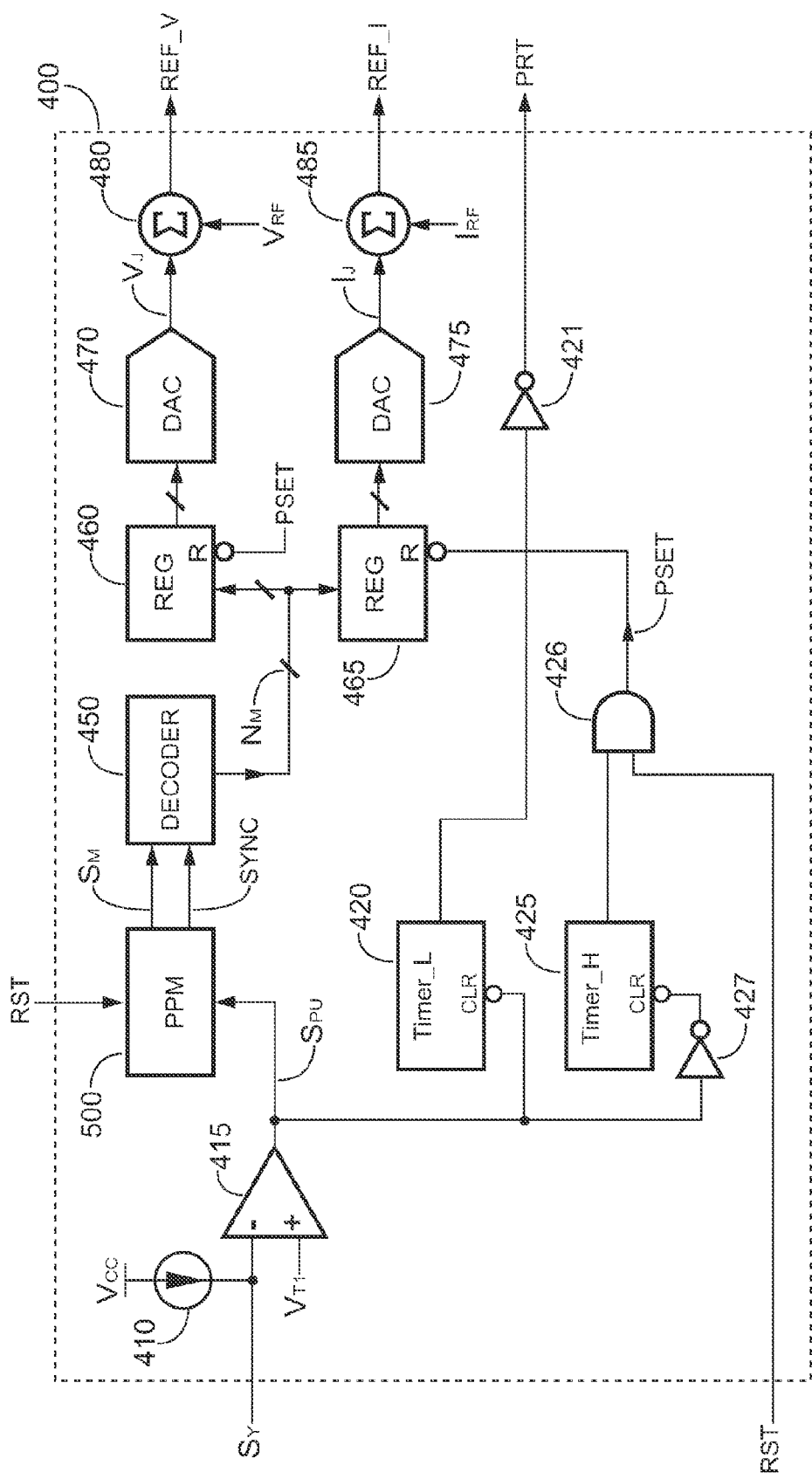
FIG. 9 shows an exemplary embodiment of a programmable circuit of the switching controller according to the present invention.

FIG. 9 shows an exemplary embodiment of the programmable circuit 400 of the switching controller 300 according to the present invention. The programmable circuit 400 comprises: a current source 410, a comparator 415, a pulse-position modulation circuit (PPM) 500, a digital decoder (DE-CODER) 450, registers (REG) 460 and 465, digital-to-analog converters (DAC) 470 and 475, adders 480 and 485, inverters 427 and 421, a timer (Timer_L) 420, a timer (Timer_H) 425, and an AND gate 426. The current source 410 is connected to pull high the control signal $S_Y$. The comparator 415 will generate a pulse signal $S_{PU}$ once the control signal $S_Y$ is lower than a threshold $V_{T1}$. The pulse-position modulation circuit 500 generates a demodulated signal $S_M$ and a synchronous signal SYNC in response to the pulse signal $S_{PU}$ derived from the control signal $S_Y$. Accordingly, the control signal $S_Y$ is modulated by pulse position modulation. The demodulated signal $S_M$ and the synchronous signal SYNC are coupled to the digital-decoder 450 to generate digital data $N_M$. The digital data $N_M$ is stored into the register 460 and the register 465. The register 460 is coupled to the digital-to-analog converter 470 for generating a voltage-adjust signal $V_J$. The adder 480 generates the reference signal REF_V by adding a reference signal $V_{RF}$ and the voltage-adjust signal $V_J$.

The register 465 is coupled to the digital-to-analog converter 475 for generating a current-adjust signal $I_J$. The adder 485 generates the reference signal REF_I by adding a reference signal $I_{RF}$ and the current-adjust signal $I_J$. Therefore, the reference signals REF_V and REF_I can be programmed by the micro-controller 80. The reflected voltage $V_S$ of the transformer 10 is used for the over-voltage protection in the switching controller 300. The threshold of this over-voltage protection (for output voltage $V_O$) is programmed by the control circuit 100 at the secondary side of the transformer 10. Furthermore, the value of the output current $I_O$ can be programmed by the control circuit 100 at the secondary side of the transformer 10.

The pulse signal $S_{PU}$ is further coupled to the timer 420 for detecting the pulse width of the pulse signal $S_{PU}$. The protection signal PRT will be generated by the timer 420 via the inverter 421 if the pulse width of the pulse signal $S_{PU}$ exceeds a period $T_{OV}$. This protection signal PRT is coupled to disable the switching signal $S_W$. Since the pulse width of the control signal $S_X$ (and the pulse signal $S_{PU}$) will be greater than the period $T_{OV}$ when the over-voltage condition of the output voltage $V_O$ is detected by the control circuit 100 at the secondary side of the transformer 10, the switching signal $S_W$ will be disabled once the over-voltage condition of the output voltage $V_O$ is detected.

The timer 425 is coupled to receive the pulse signal $S_{PU}$ through the inverter 427. The timer 425 will generate a reset signal PSET via the AND gate 426 once the pulse width of the pulse signal $S_{PU}$ doesn't exceed a specific period $T_{OT}$. The power-on reset signal RST is also coupled to generate the reset signal PSET through the AND gate 426. The reset signal PSET is coupled to clear the registers 460 and 465 for resetting the values of the voltage-adjust signal $V_J$ and the current-adjust signal $I_J$ to zero. Therefore, the reference signal REF_V will be set to a minimum value ($V_{RF}$) for the over-voltage protection once the control signal $S_X$ is not generated by the control circuit 100 in time periodically. Besides, the reference signal REF_I will be set to a minimum value ($I_{RF}$) for regulating the output current $I_O$ once the control signal $S_X$ is not generated by the control circuit 100 in time periodically. Therefore, if the micro-controller 80 is not operated properly, the over-voltage threshold REF_V and the current limit threshold REF_I will be reset to their minimum values, respectively. Consequently, the control signal $S_X$ generated by the control circuit 100 is used for:

(1) the over-voltage protection when the over-voltage condition is detected in the control circuit 100;

(2) the communication for setting the over-voltage threshold (REF_V) and the current limit threshold (REF_I) in the switching controller 300;

(3) resetting the timer 420 in the switching controller 300 to ensure that the control circuit 100 is operated properly, otherwise the over-voltage threshold (REF_V) and the current limit threshold (current reference signal, REF_I) of the switching controller 300 will be reset to their respective minimum values for protecting and regulating the power converter.

Figure 10:
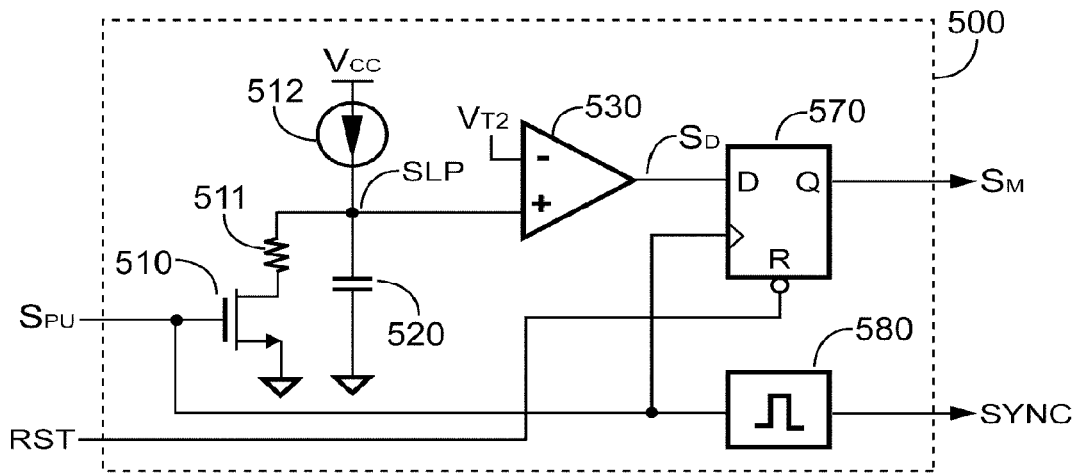
FIG. 10 shows an exemplary embodiment of a pulse-position modulation circuit of the programmable circuit according to the present invention.

FIG. 10 shows an exemplary embodiment of the pulse-position modulation circuit 500 of the programmable circuit 400 according to the present invention. The pulse-position modulation circuit 500 operates as a de-modulator for an input signal with pulse-position modulation. The pulse-position modulation circuit 500 comprises a transistor 510, a resistor 511, a current source 512, a capacitor 520, a comparator 530, a flip-flop 570, and a pulse generation circuit 580. The current source 512 charges the capacitor 520. The pulse signal $S_{PU}$ is coupled to discharge the capacitor 520 via the transistor 510 and the resistor 511. A slope signal SLP is thus generated across the capacitor 520. The comparator 530 will generate a data signal $S_D$ with logic-high level once the slope signal SLP is higher than a threshold $V_{T2}$. The data signal $S_D$ will be latched into the flip-flop 570 in response to the pulse signal $S_{PU}$ for generating the demodulated signal $S_M$. The flip-flop 570 is reset by the power-on reset signal RST. The pulse signal $S_{PU}$ is further coupled to generate the synchronous signal SYNC via the pulse generation circuit 580.

Figure 11:
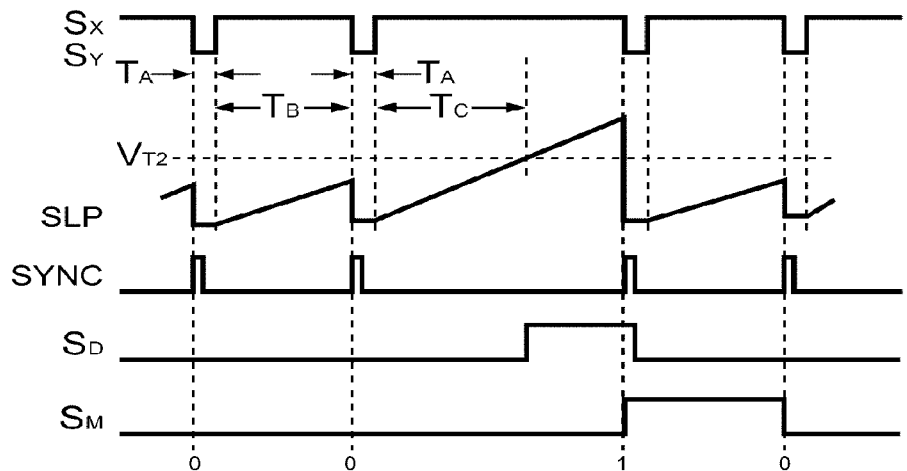
FIG. 11 shows waveforms of control signals, a slope signal, a synchronous signal, a data signal, and a demodulated signal.

FIG. 11 shows the waveforms of the control signals $S_X$ and $S_Y$, the slope signal SLP, the synchronous signal SYNC, the data signal $S_D$, and the demodulated signal $S_M$. The waveforms show that the demodulated signal $S_M$ is generated in accordance with the pulse position of the control signal $S_X$.

Figure 12:
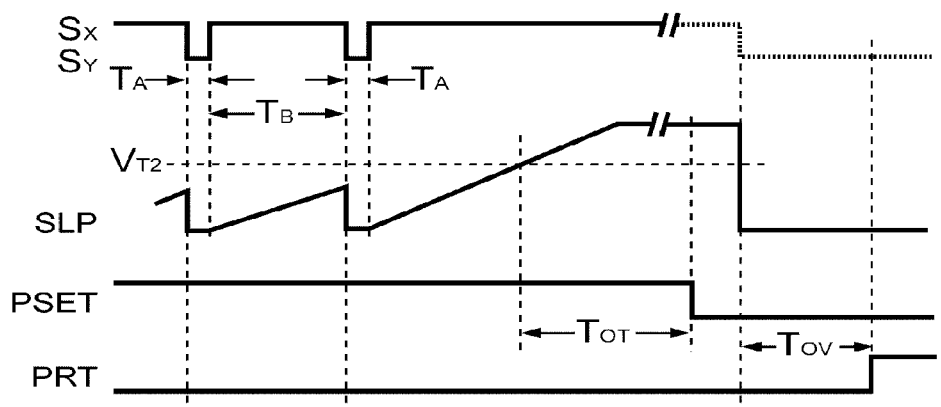
FIG. 12 shows waveforms of control signals, a reset signal, and a protection signal.

FIG. 12 shows the waveforms of the control signals $S_X$ and $S_Y$, the reset signal PSET, and the protection signal PRT. The reset signal PSET will be generated if the control signal $S_X$ is not generated for longer than the period $T_{OT}$. The protection signal PRT will be generated if the pulse width of the control signal $S_X$ is greater than the period $T_{OV}$.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A circuit for controlling a programmable power converter, comprising:
   a control circuit, generating a programmable over-voltage threshold for performing an over-voltage protection of an output voltage of said programmable power converter, generating a control signal by comparing said output voltage and said programmable over-voltage threshold, and detecting said output voltage for generating a feedback signal in response to a programmable voltage-reference signal and said output voltage, wherein said programmable over-voltage threshold will be reset to a minimum value whenever said programmable power converter is powered on;
   a switching controller, coupled to detect a switching current of a transformer for generating a switching signal coupled to switch said transformer for generating said output voltage and an output current in response to said feedback signal and said switching current of said transformer; and
   a first opto-coupler, coupled to transfer said feedback signal from said control circuit to said switching controller;
   wherein said control circuit is at the secondary side of said transformer, and said switching controller is at the primary side of said transformer; and
   wherein said control circuit has a communication interface for communicating with external devices.

2. The circuit as claimed in claim 1, wherein said switching controller is coupled to detect a reflected signal of said transformer for regulating said output current of said programmable power converter in response to a demagnetizing time of said transformer.

3. The circuit as claimed in claim 1, wherein said switching controller is coupled to detect a reflected signal for performing said over-voltage protection.

4. The circuit as claimed in claim 3, further comprising a second opto-coupler for transferring said control signal of said control circuit to said switching controller.

5. The circuit as claimed in claim 4, wherein said control signal is coupled to generate an over-voltage signal for disabling said switching signal.

6. The circuit as claimed in claim 4, wherein said control circuit further comprises:
   a micro-controller for programming said programmable voltage-reference signal and said control signal;
   wherein said control signal is coupled to control said switching controller via said second opto-coupler.

7. The circuit as claimed in claim 6, wherein said control circuit comprises:
   a watch-dog timer, coupled to receive a controlling signal from said micro-controller;
   wherein said watch-dog timer will generate an expired signal if said controlling signal is not generated in time periodically; and
   wherein said programmable over-voltage threshold will be reset to a minimum value in response to said expired signal.

8. The circuit as claimed in claim 6, wherein said control circuit further comprises:
   an analog-to-digital converter, coupled to detect said output voltage of said programmable power converter;
   wherein an output of said analog-to-digital converter is coupled to said micro-controller.

9. The circuit as claimed in claim 6, wherein said micro-controller has a memory circuit including a program memory and a data memory.

10. The circuit as claimed in claim 4, wherein said control circuit generates said control signal coupled to program an over-voltage threshold in said switching controller for said over-voltage protection.

11. The circuit as claimed in claim 10, wherein said control circuit generates said control signal coupled to control a current limit threshold in said switching controller for regulating said output current of said programmable power converter.

12. The circuit as claimed in claim 11, wherein said current limit threshold and said over-voltage threshold will be reset to respective minimum values whenever said programmable power converter is powered on.

13. The circuit as claimed in claim 11, wherein said current limit threshold and said over-voltage threshold will be reset to respective minimum values if said control signal is not generated in time.

14. The circuit as claimed in claim 4, wherein said control signal is modulated by pulse position modulation.

15. The circuit as claimed in claim 1, wherein said programmable voltage-reference signal will be reset to an initial value whenever said programmable power converter is powered on.

* * * * *